(12) United States Patent
Matthews et al.

(10) Patent No.: US 8,289,724 B2
(45) Date of Patent: Oct. 16, 2012

(54) SIGNAL-PRODUCING MECHANISM

(75) Inventors: Michael G. Matthews, Carlsbad, CA (US); Kevin Cousineau, Ramona, CA (US); Scott C. Asbill, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 12/185,711

(22) Filed: Aug. 4, 2008

(65) Prior Publication Data

US 2008/0288092 A1 Nov. 20, 2008

Related U.S. Application Data

(62) Division of application No. 10/848,024, filed on May 17, 2004, now Pat. No. 7,440,290.

(51) Int. Cl.
*H05K 1/18* (2006.01)
(52) U.S. Cl. ............ 361/761; 361/782; 361/784; 338/69
(58) Field of Classification Search .................. None
See application file for complete search history.

(56) References Cited

U.S. PATENT DOCUMENTS

| | | | |
|---|---|---|---|
| 4,132,873 A | 1/1979 | Vanderpeol | |
| 4,246,452 A | 1/1981 | Chandler | |
| 4,476,356 A | 10/1984 | Nakayama | |
| 4,511,759 A | 4/1985 | Irlande | |
| 4,833,440 A | 5/1989 | Wojtanek et al. | |
| 4,896,003 A | 1/1990 | Hsieh | |
| 5,164,697 A | 11/1992 | Kramer | |
| 5,467,108 A | 11/1995 | Mimlitch | |
| 6,320,569 B1 | 11/2001 | Kinman | |
| 6,518,953 B1 | 2/2003 | Armstrong | |
| 6,787,865 B2 | 9/2004 | Endo et al. | |
| 6,841,743 B2 * | 1/2005 | Okada et al. | ........... 200/6 A |
| 7,440,290 B2 | 10/2008 | Matthews et al. | |
| 2003/0085793 A1 | 5/2003 | Inoue et al. | |
| 2004/0080395 A1 | 4/2004 | Okada et al. | |

FOREIGN PATENT DOCUMENTS

| | | |
|---|---|---|
| EP | 1369887 A2 | 12/2003 |
| JP | 07084719 | 3/1995 |

OTHER PUBLICATIONS

International Search Report for PCT/US2005/012067, International Searching Authority—European Patent Office, Feb. 10, 2006.
Written Opinion—PCT/US2005/012067, International Search Authority, European Patent Office, Feb. 10, 2006.

* cited by examiner

*Primary Examiner* — Tuan T Dinh
(74) *Attorney, Agent, or Firm* — Nicholas A. Cole

(57) ABSTRACT

The present invention provides devices for controlling a desired output of an output device. These devices include a first conductor, a second conductor having a varying, predetermined spacing from the first conductor, and a third conductor positioned on the actuator mechanism and having a plurality of interconnecting positions between the first conductor and the second conductor. A predetermined one of a plurality of output signals may be produced when the third conductor connects the first conductor and the second conductor to control the desired output of the output device.

8 Claims, 4 Drawing Sheets

SIGNAL-PRODUCING MECHANISM

CROSS-REFERENCES TO RELATED APPLICATIONS

This divisional application claims priority to application Ser. No. 10/848,024 filed on May 17, 2004, the contents of which are incorporated herein by reference.

BACKGROUND

The present invention relates to control systems and associated control methods, and more particularly, to a multiple position actuator mechanism, directional control or navigation key for an electronic device.

Present control systems and devices, such as joysticks or navigation type keys, are capable of generating a predetermined output signal by having a user move a member of the control system or device in a given direction. The generated output signal is thereby selectable from one or more predetermined output signals that each correspond to one or more predetermined directions of movement. The number of predetermined directions is usually relatively small, and is limited by the physical space required for the mechanical and electrical components of the control system that are associated with generating the output signal. For instance, each of the predetermined output signals may require its own mechanical and electrical components, such as those components associated with a switch, as well as the associated space or range of positions that correspond to moving the switch in the selected direction. With the ever-increasing demand for smaller sized control systems with greater functionality, there is a need for an improved control system having a reduced number of mechanical and electrical components, and having a greater number of predetermined directions and/or predetermined output signals.

SUMMARY

Embodiments of the present invention provide control systems, and associated control methods, having reduced numbers of components and greater amounts of control or functionality.

In one embodiment, a control system comprises an electrical circuit portion having a plurality of electrical components each having known electrical characteristics. A variable resistance element is connectable with the electrical circuit portion and has a plurality of resistance values. Further, an input mechanism is connectable with the variable resistance element and has a plurality of input positions. The input mechanism is operable at each of the plurality of input positions to connect the variable resistance element to the electrical circuit portion with a predetermined one of the plurality of resistance values. Additionally, a control signal is producible by a connection between the electrical circuit portion and the variable resistance element. The control signal is selectable from a plurality of control signals each corresponding to one of the plurality of input positions.

In another embodiment, a signal-producing mechanism comprises a first conductor, a second conductor having a varying, predetermined spacing from the first conductor and a third conductor having a plurality of interconnecting positions between the first conductor and the second conductor. The signal-producing mechanism further includes a predetermined one of a plurality of output signals producible when the third conductor connects the first conductor and the second conductor in each of the plurality of interconnecting positions.

In yet another embodiment, a signal-producing mechanism comprises a first circuit portion having a first resistance, a second circuit portion having a second resistance, and a third circuit portion having a third resistance. At least one of the first circuit portion, the second circuit portion and the third circuit portion is positionable in one of a plurality of interconnecting positions with respect to the other two circuit portions. Further, at least one of the first resistance, the second resistance and the third resistance comprises a variable resistance that varies in association with each one of the plurality of interconnecting positions. Additionally, the signal-producing mechanism produces a plurality of selectable output signals, each corresponding to one of the plurality of interconnecting positions.

In another embodiment, a directional control comprises a body movable into at least one of a plurality of positions corresponding to one of a plurality of selectable directions. Further, an electrical circuit is operable to produce a plurality of outputs signals each corresponding to one of the plurality of selectable directions. Additionally, a conductor, movable by the body into contact with the electrical circuit, has a plurality of resistance values each corresponding to one of the plurality of selectable directions.

In still another embodiment, a control system comprises a member movable about a center point to select a directional output having an x-axis component and a y-axis component. The system includes a directional control comprising a first conductive member having a circular shape and a second conductive member having a circular shape and positionable non-concentrically within the first conductive member. The directional control further includes a first conductive portion positionable in a first plurality of positions to connect the first conductive member and the second conductive member, where each of the first plurality of positions corresponds to a first signal representative of the x-axis component of the directional output. The directional control further includes a third conductive member having a circular shape and positionable concentrically within the first conductive member, and a fourth conductive member having a circular shape and positionable non-concentrically within the third conductive member. Additionally, a second conductive portion is positionable in a second plurality of positions to connect the third conductive member and the fourth conductive member, where each of the second plurality of positions corresponds to a second signal representative of the y-axis component of the directional output.

Further embodiments include a method of controlling a desired output of an output device. This method includes connecting an electrical resistance element having a selected one of a plurality of resistance values with an electrical circuit portion having a plurality of electrical components. An electrical characteristic associated with the connected electrical circuit portion and the variable resistance element is determined. And, a control signal based on the electrical characteristic to control the desired output of the output device is generated.

In another embodiment, a method of generating a directional control signal comprises applying a voltage across a first conductive member and a second conductive member that have a spacing between one another that varies in each of a plurality of directions. A first conductive portion is connected between the first conductive member and the second conductive member in a selected one of a plurality of directions, where the resistance characteristic of the first conductive portion varies with a size of the variable spacing. Additionally, an electrical characteristic associated with a circuit formed by the first conductive member and the second conductive member connected by the first conductive portion is measured. Further, a directional control signal corresponding to the selected one of the plurality of directions is generated.

In another embodiment, a control system is disclosed. The control system includes means for connecting an electrical resistance element having a selected one of a plurality of resistance values with an electrical circuit portion having a plurality of electrical components, means for determining an electrical characteristic associated with the connected electrical circuit portion and the variable resistance element, and, means for generating a control signal based on the electrical characteristic to control the desired output of an output device.

In another embodiment, a control system is disclosed comprising means for applying a voltage across a first conductive member and a second conductive member that have a spacing between one another that varies in each of a plurality of directions, means for connecting a first conductive portion between the first conductive member and the second conductive member in a selected one of a plurality of directions, where the resistance characteristic of the first conductive portion varies with a size of the variable spacing, means for measuring an electrical characteristic associated with a circuit formed by the first conductive member and the second conductive member connected by the first conductive portion, and means for generating a directional control signal corresponding to the selected one of the plurality of directions.

BRIEF DESCRIPTION OF THE DRAWINGS

The various embodiments of the present invention will hereinafter be described in conjunction with the appended drawings provided to illustrate and not to limit the present invention, wherein like designations denote like elements, and in which.

DETAILED DESCRIPTION

Embodiments of the present invention provide systems and methods for generating a variable output signal based on a selected one of a plurality of inputs. The selected input, for example, may be associated with a direction and duration of a movement of a navigation key on an electronic device. Further, for example, the movement of the navigation key may be correlated with the movement or selection of a generated graphic on an output device, such a visual display unit. Additionally, the output signal may be used, for example, to control chosen functionality of the electronic device.

Figure 1:
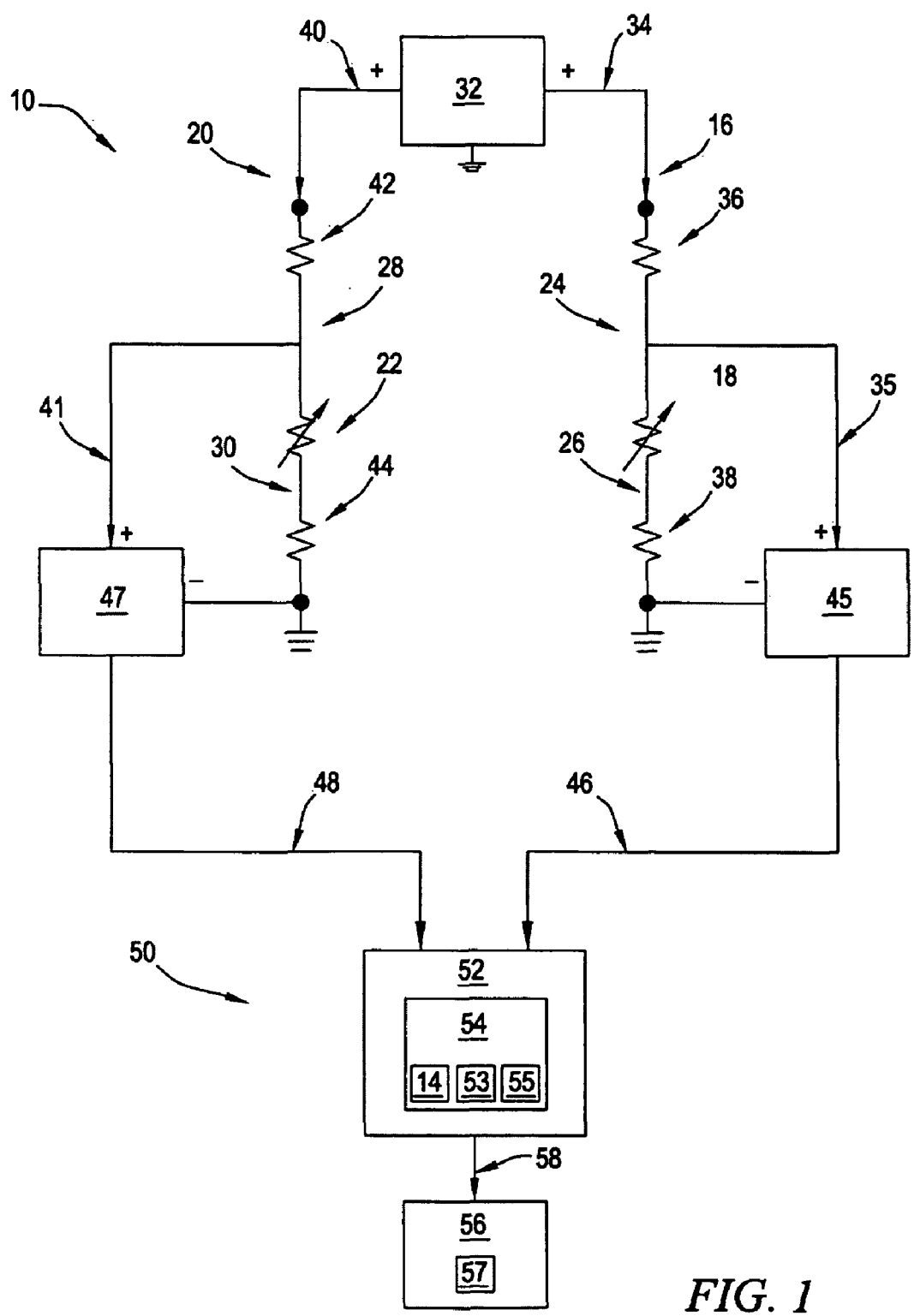
FIG. 1 is a partial schematic control circuit diagram and partial schematic diagram of an associated control system.
Figure 2:
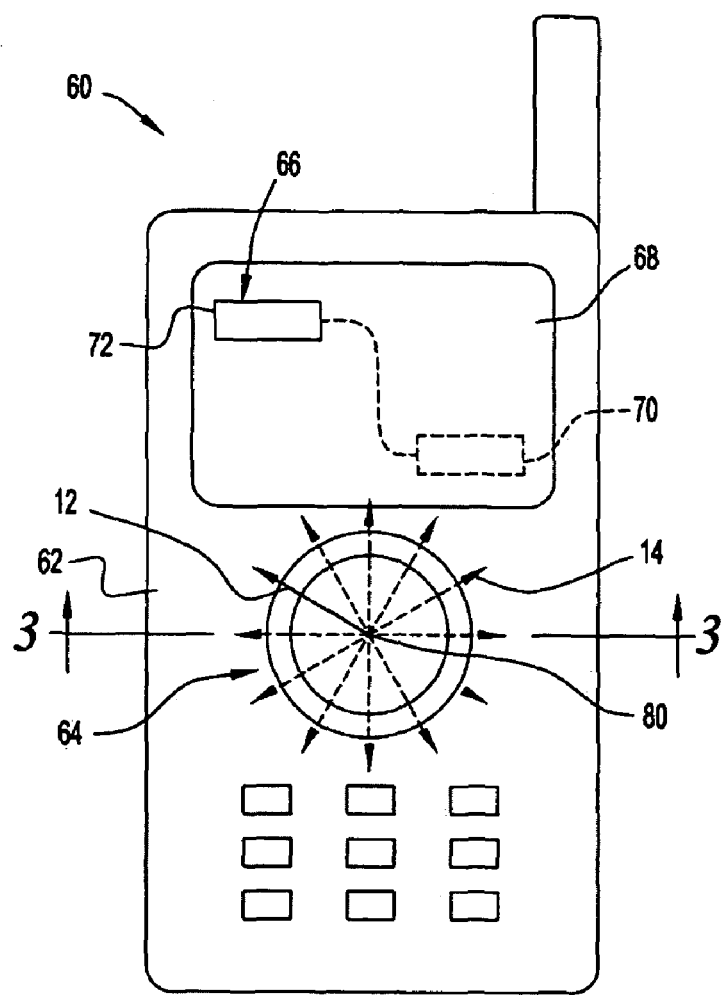
FIG. 2 is a schematic diagram of another control system, such as a mobile phone, incorporating an actuator mechanism, such as a navigation key, associated with the control circuit.

Referring to FIGS. 1 and 2, one embodiment of a control circuit 10, such as for determining a movement duration and/or selected direction 12 (FIG. 2) from a plurality of directions 14 on a navigation key 64, includes a first circuit 16 having a first variable resistance portion 18 and a second circuit 20 having a second variable resistance portion 22, each having a plurality of resistance values. Each variable resistance portion 18, 22 has a plurality of positions that may be associated with one of the plurality of resistance values and one of the plurality of directions 14, as will be explained below in more detail. Further, first circuit 16 includes first and second electrically conductive members 24, 26, which may have a variable length and/or electrical resistance, that connect first variable resistance portion 18 with a first resistor 36 on one end and a second resistor 38 at the opposite end. Similarly, second circuit 20 includes third and fourth electrically conductive member 28, 30, which may have a variable length and/or electrical resistance, that connect second variable resistance portion 22 with a third resistor 42 at one end and a fourth resistor 44 at the opposite end. A power source 32, such as a battery or alternating current source, may be actuated to apply a first voltage 34 to first circuit 16 and a second voltage 40 to second circuit 20. Voltages 34, 40 result in generation of first and second output signals 46, 48 based on measured electrical characteristics of the respective circuits 16, 20. Output signals 46, 48 thereby represent a desired input associated with a position of each variable resistance portion 18, 22, such as a selected duration of movement and/or a selected direction 12 of navigation key 64. First and second output signals 46, 48 may be associated with, for example, a sensed voltage value for each circuit 16, 20 that may be utilized in a voltage division calculation to determine the exact position of selected direction 12. A selected one of each of the plurality of directions 14 may be precisely determined because first and second variable resistance portions 18, 22 each have a unique or independent resistance value associated with each of the plurality of directions 14.

In one embodiment, for example, a first variable voltage 35 across first variable resistance portion 18, second conductive member 26 and second resistor 38, may be received by a first conversion mechanism 45. Conversion mechanism 45, such as an analog-to-digital converter ("ADC"), may transform first variable voltage 35 into first output signal 46 that may be used as an input by other electronic components of the system, such as a portable electronic device like a mobile phone. In the example of a mobile phone, for instance, the present invention may advantageously utilize unused or under-used modem chips as conversion mechanism 45, thereby eliminating the need to add new components to the device.

Additionally, control circuit 10 may form a part of a control system 50 that includes processing devices and real or virtual controlled mechanisms. Suitable examples of control system 50 include a visual output or display device, an audio output device, a mobile phone, a portable phone, a pager, a wireless two way communications device, a personal digital assistant, a personal computer, a gaming system, a remote control system, a global positioning system ("GPS") receiver or controller, a toaster temperature control, a battle bot, a remote controlled car or plane, a control panel for video conferencing camera control, an electronic multi-directional scrolling and panning device such as for a touch screen or tablet personal computer, an adjustable audio volume or display contrast device, a home theater or automobile surround sound controller, a variable zoom controller, and other similar types of systems involving any type of real or virtual mechanism having a controllable output. In one embodiment, for example, control system 50 includes a signal analyzer 52 that may receive first and second output signals 46, 48 and process them to determine a movement duration and/or selected direction 12. Further, signal analyzer 52 may include a program, table or database 54 that associates each of a plurality of potential received signals 53, such as a movement duration and/or each of the plurality of directions 14, with one or more of a plurality of control signals 55. For example, received signals such as signals 46, 48 corresponding to "tapping" or "holding" navigation key 64 in selected direction 12 may each be associated with a different one of the plurality of control signals 55. In this example, "tapping" may be defined as changing a position of navigation key 64 in selected direction 12 for a predetermined duration or amount of time, typically considered a relatively short amount of time. On the other hand, "holding" may be defined as changing a position of navigation key 64 in selected direction 12 for a predetermined duration or amount of time greater than "tapping." Additionally, changing a position of navigation key 64 in each of the plurality of directions 14 may be associated with a separate one of the plurality of control signals 55. Control system 50 may further include a controllable electronic device or output mechanism 56, such as those devices mentioned above with respect to control system 50, that interacts with control circuit 10. Thus, signal analyzer 52 may generate one or more selected control signals 58 from plurality of control signals 55, based upon a duration of movement and/or selected direction 12, and send the control signal(s) to controllable device 56 to control a predetermined output 57 of device 56. For example, predetermined output 57 may include a generated graphic, a generated audible sound, a movement, a function, and any other type of controllable action.

In at least some embodiments, control system 50 advantageously is able to detect small changes in electrical characteristics, such as voltage, resistance and/or current, associated with control circuit 10 and the positioning/movement of variable resistance portions 18, 22. Further, power source 32 may be the same power source used to operate controllable device 56. Resistors 36, 38, 42 and 44 have substantially fixed resistance values, and they do not need to be high precision resistors.

Figure 3:
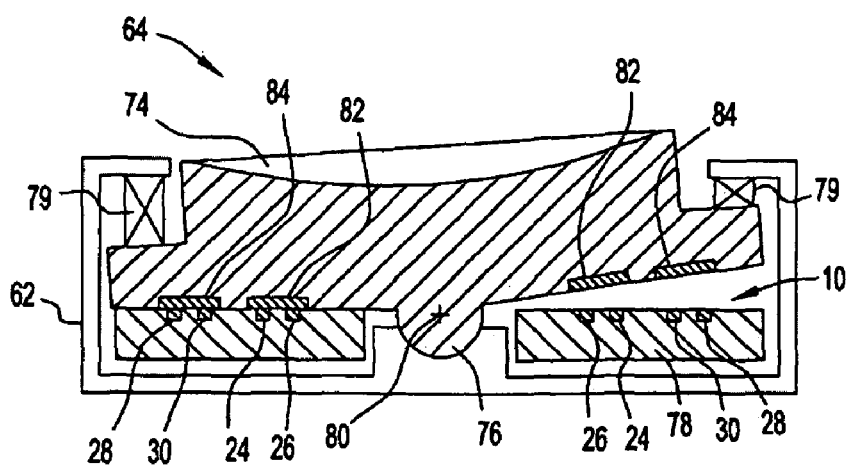
FIG. 3 is a cross-sectional diagram of the control system of FIG. 2 along line 3-3, where the actuator mechanism has been depressed in a selected direction to activate the control circuit.
Figure 4:
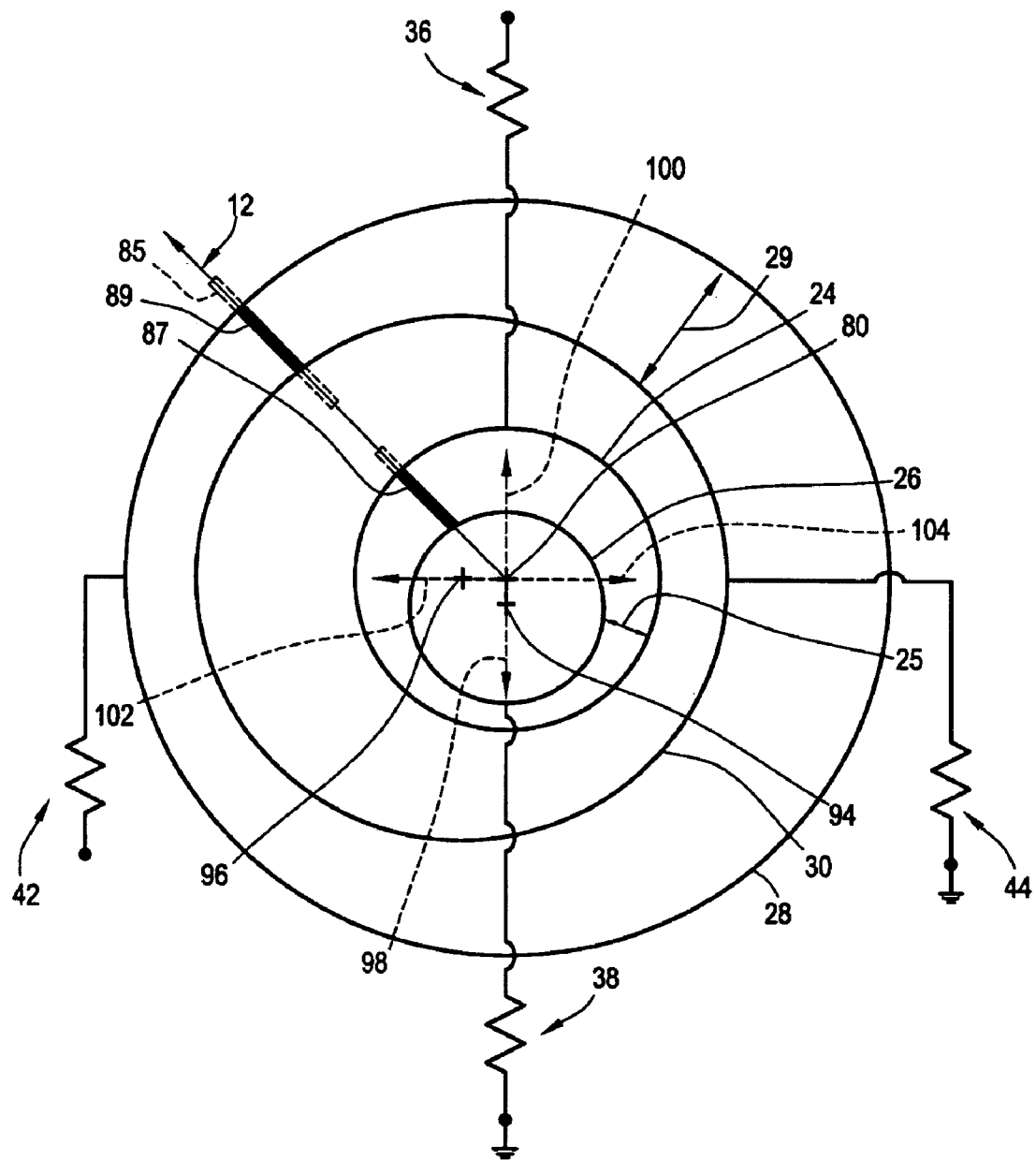
FIG. 4 is a partial schematic diagram of one version of a set of conductors forming a variable resistance portion of a control circuit.

Referring to FIGS. 2-4, one embodiment of a control system 60, such as a mobile phone or other portable electronic device, includes a housing 62 having an actuator mechanism or navigation key 64 movable in any one of plurality of directions 14. Each of plurality of directions 14 and/or the duration of time spent in each position corresponds to one of a plurality of output signals that may be generated by control system 60. The output signal(s) generated by actuator mechanism 64 may be utilized to control an output of a local or remote output device. For instance, actuator mechanism 64 may locally control another mechanism located on control system 60, such as to control movement of a generated graphic 66 on a display device 68 from a first position 70 to a second position 72, or such as to select an option from a list of options on a display. Additionally, for instance, actuator mechanism 64 may remotely control another mechanism located apart from housing 62, such as a mode or graphic on a separate audio or visual output device, or such as to control movement or positioning of a separate mechanical or virtual device or image. Although discussed herein in one embodiment as a directional control for an image on a visual display, it should be understood that control system 60 may be utilized to control any type of output on any type of device.

Figure 5:
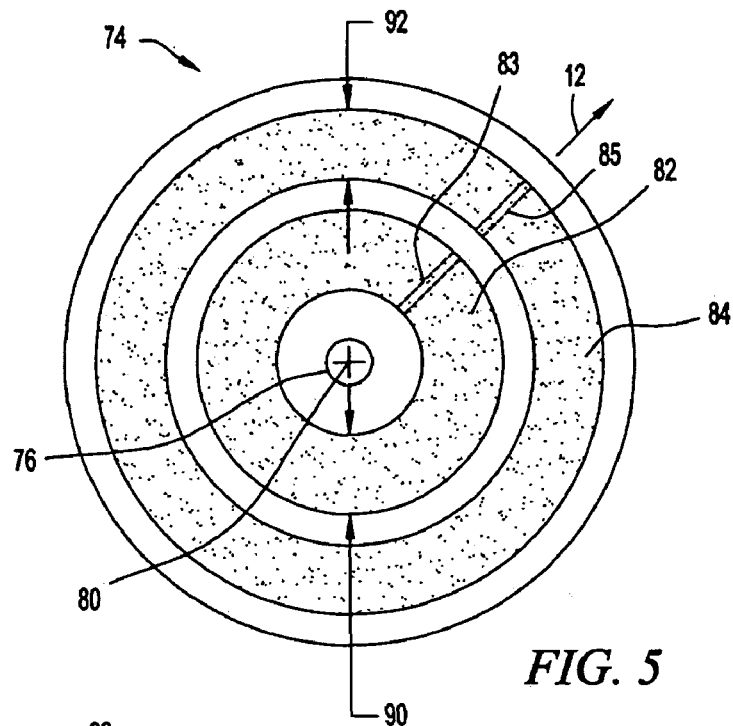
FIG. 5 is a bottom view of the body of the actuator mechanism of FIG. 3 and the conductive rings, which are shaded for illustrative purposes, mounted therein.

Referring specifically to FIGS. 3-5, in one embodiment, actuator mechanism 64 includes a substantially rigid body 74 tiltable, such as on an integral or separate geometric peg or ball member 76, relative to a circuit board 78 about a first center axis/point 80 in any one of plurality of directions 14 (FIG. 2). The plurality of directions 14 (FIG. 2), therefore, represent circular positions ranging from 0° to 360° relative to first center axis/point 80 when viewed from the top or bottom of actuator mechanism 64. Further, circuit board 78 includes all or portions of control circuit 10 (FIG. 1), such as conductive members 24, 26, 28, 30. To aid in withdrawing body 74 from undesirable contact with circuit board 78, biasing member 79, such as a resilient washer, ring or spring, may be positioned to interact with body 74 to apply a force that moves body 74 away from circuit board 78. Further, the bottom surface of body 74, which may form at least a partially conical shape, includes first and second conductive rings 82, 84 which may be concentric rings centered about first center axis/point 80. In operation, as body 74 is tilted by a user to chose selected direction 12, portions of rings 82, 84 are moved from a first or "off" position, which may be in a first plane, to respectively tangentially contact, along part of the conical surface, first and second circuits 16, 20 in a second or "on" position and respectively bridge variably-spaced circular conductive members 24, 26 and 28, 30, which may be in a second plane. First and second variable resistance portions 87, 89 thus include, in this embodiment, the areas on respective conductive rings 82, 84 that span the respective spacing 25, 29 (FIG. 4) between conductive members 24, 26 and 28, 30 and that are substantially tangent to, or in the same plane as, first and second circuits 16, 20 when body 74 is moved or tilted into the "on" position in any selected direction 12 of the plurality of directions 14. Each conductive ring 82, 84 has a width 90, 92 large enough to span the respective distance or spacing 25, 29 between conductive members 24, 26 and 28, 30 in any of plurality of directions 14. As such, first and second variable resistance portions 87, 89 each have a size and/or length that corresponds to the actual distance or spacing 25, 29 between respective conductive members 24, 26 and 28, 30 in the given selected direction 12. The size or length of first and second variable resistance portions 87, 89 may be all or any portion of the size or length of the entire section 83, 85 (FIGS. 4 and 5) of conductive rings 82, 84 when body 74 is moved into the "on" position in selected direction 12. The segment of each conductive ring 82, 84 that respectively forms first and second variable resistance portion 87, 89 will therefore vary in size/length and relative position on the respective ring depending upon the selected one 12 of the plurality of directions 14. Alternatively, for a navigation key 64 that is rotatable about an axis perpendicular to the plane of first and second circuits 16, 20, rings 82, 84 each may be replaced by individual electrically conductive strips or segments corresponding to sections 83, 85 that are rotated into selection direction 12. In any case, the variance in size/length of variable resistance portions 87, 89 is detectable by control system 60 as a change in resistance, current or voltage, and thus system 60 is able to determine selected position 12 such as through voltage division.

For example, in this embodiment, output signals 46, 48 associated with variable resistance portions 87, 89 bridging the respective circular conductive members 24, 26, 28, 30 may be associated with an x- or y-component of selected direction 12 depending on the relative positioning of the circular components. For example, referring to the embodiment of FIG. 4, first conductive member 24 of first circuit 16 is centered about first center axis/point 80, while second conductive member 26 is positioned within first conductive member 24, but centered about second center axis/point 94 which is parallel to but spaced apart from first center axis/point 80. Therefore, spacing distance 25 varies depending upon angular position, as a 0° circular position 98 corresponds to a position where first and second conductive members 24, 26 are most closely spaced, while a 180° circular position 100 corresponds to a position where first and second conductive members 24, 26 are most distantly spaced. Thus, the spacing 25 between first and second conductive members 24, 26 continually increases in any direction around the rings between 0° position 98 and 180° position 100, and any selected position in between may be correlated to a y-component of selected direction 12.

Similarly, second circuit 20 includes circular conductive members 28, 30 that have offset centers. For example, referring to FIG. 4, third conductive member 28 may be centered about first center axis/point 80, and fourth conductive member 30 may be centered within third conductive member 28 about third center axis/point 96 which is parallel to but spaced apart from first center axis/point 80 and additionally non-coaxial with center axis/point 94. In this layout, third and fourth conductive members 28, 30 encompass first and second conductive members 24, 26, with first and third conductive members 24, 28 being concentric. Therefore, spacing distance 29 varies depending on angular position, as a 90° circular position 102 corresponds to a position where third and fourth conductive members 28, 30 are most closely spaced, while a 270° circular position 104 corresponds to a position where third and fourth conductive members 28, 30 are most distantly spaced. Thus, the spacing 29 between third and fourth conductive members 28, 30 continually increases in any direction around the rings between 90° position 102 and 270° position 104, and any selected position in between may be correlated to a x-component of selected direction 12.

By positioning the closest spaced portions of first and second conductive members 24, 26 in a circular position ±90° relative to the closest spaced portion of third and fourth conductive members 28, 30, the bridging of these respective conductive members by first and second variable resistance portions 87, 89 of conductive rings 82, 84 on body 74 thereby allows the x- and y-components of selected direction 12 to be determined by analyzing the characteristics of the completed first and second circuits 16, 20. In this case, all sections of first and second variable resistance portions 87, 89, conductive members 24, 26, 28, 30 and conductive rings 82, 84 have known electrical characteristics, such as resistance. Since all components of first and second circuits 16, 20 are known, the electrical characteristics of first and second variable resistance portions 87, 89 can thereby be deduced through their affect on the electrical characteristics of first and second circuits 16, 20 and thereby correlated to selected direction 12. In other words, each of first and second circuits 16, 20 may include a plurality of known components and a variable resistance portion that has a resistance value that varies depending on the selected one 12 of the plurality of directions 14.

Figure 6:
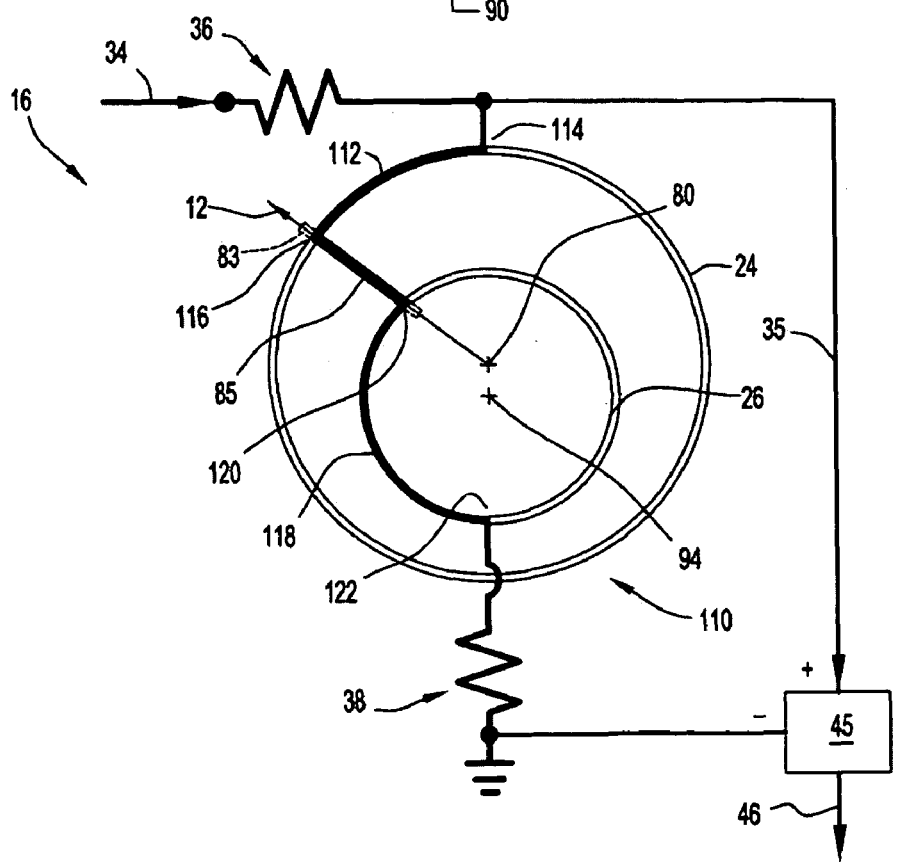
FIG. 6 is a schematic diagram of the first circuit of FIG. 4 with an electrical path represented in bold lines for illustrative purposes.

Referring to FIG. 6, the variable resistance portion 110 of first circuit 16 may also be considered to include at least parts of first and second conductive members 24, 26, as well as first variable resistance portion 87, as any change in the overall length of first circuit 16 corresponds to a change in electrical characteristics of the circuit. For instance, in this example, variable resistance portion 110 corresponds to a first segment 112 of first conductive member 24 that lies between points 114 and 116, first variable resistance portion 87, and a second segment 118 of second conductive member 26 that lies between points 120 and 122. Points 114 and 116 are the points at which first resistor 36 and first variable resistance portion 87 respectively connect to first conductive member 24. Similarly, points 120 and 122 are the points at which first variable resistance portion 87 and second resistor 38 respectively connect to second conductive member 26. Due to the offset centers 80, 94 of circular conductive members 24, 26, the length of the path on first circuit 16 will vary from point 114 to point 122 depending on the selected direction 12 where first variable resistance portion 87 connects conductive members 24, 26. The length of the path from point 114 to point 122 corresponds to the overall resistance value of first circuit 16, since the resistance values associated with each first circuit component and each section of first and second conductive members 24, 26 are known. Thus, since the structure and electrical characteristics of first and second conductive members 24, 26 are known, the present system calculates at least an x- or y-component of the selected direction 12 by analyzing first output 46, which may represent the resistance, current or voltage of first circuit 16. The electrical characteristics of second circuit 20 change in a similar manner, and second output 48 in combination with first output 46 may be used to determine selected direction.

Although in this embodiment first circuit 16 includes two off-center conductive members 24, 26 that are circular, it should be understood that other configurations are possible that achieve a circuit having a resistance portion that varies in relation to a selected direction and/or movement duration. For instance, first and second conductive members 24, 26 could be concentric circles if first and second conductive rings 82, 84, or one of first and second conductive members 24, 26, comprise a material that has a substantially continually varying resistance from 0 to 360 degrees. In another alternative, only a single circuit and a single conductive ring may be required to measure both the x- and y-component of the selected direction if both first and second conductive members 24, 26 are offset circles, where either one of first or second conductive members 24, 26 or the associated conductive ring comprise a material that has a substantially continually varying resistance from 0 to 360 degrees.

Thus, in one embodiment, the systems and devices described above provide a method of controlling a desired output of an output device by connecting an electrical resistance element having a selected one of a plurality of resistance values with an electrical circuit portion having a plurality of electrical components, which may have known values. These systems and devices determine an electrical characteristic associated with the connected electrical circuit portion and the variable resistance element, which relates to the selected resistance value associated with the resistance element. Further, these systems and devices generate a control signal based on the electrical characteristic to control the desired output of the output device. In another embodiment, the systems and devices described above provide a method of generating a directional control signal by applying a variable resistance to a control circuit, where the variable resistance value changes in association with a selected movement duration and/or direction. In one embodiment of this method, a voltage is applied across a first conductive member and a second conductive member that have a variable length or resistance, and/or a spacing between one another that varies in each of a plurality of directions. Additionally, a conductive portion is movable to connect between the first conductive member and the second conductive member in a selected one of a plurality of directions. A resistance characteristic of the conductive portion varies with a size of the variable spacing or with a variance in the length/resistance of the first and second conductive portions, and hence the selected direction. An electrical characteristic associated with a circuit formed by the interconnected segments of the first conductive member, the second conductive member and the first conductive portion is measured. The electrical characteristic may be voltage, current or resistance, which through voltage division allows the selected direction to be determined since the other electrical characteristics of the circuit are known. And, a directional control signal corresponding to a movement duration and/or the selected one of the plurality of directions is generated based on the measured electrical characteristic. This directional control signal may comprise the actual measured electrical characteristic, or may be derived by processing the measured electrical characteristic.

While the various embodiments of the present invention have been illustrated and described, it will be clear that the present invention is not limited to these embodiments only. Numerous modifications, changes, variations, substitutions and equivalents will be apparent to those skilled in the art without departing from the spirit and scope of the present invention as described in the claims.

What is claimed is:

1. A signal-producing mechanism, comprising:
   an actuator mechanism movable in a plurality of directions;
   a first conductor having a circular shape;
   a second conductor having a circular shape and positioned non-concentrically within the first conductor so as to have a varying, predetermined spacing from the first conductor; a third conductor positioned on the actuator mechanism and having a plurality of interconnecting positions between the first conductor and the second conductor, the interconnecting positions corresponding to the plurality of mobility directions of the actuator mechanism, wherein the third conductor further comprises a variable resistance portion having an independent resistance value in each one of the plurality of interconnecting positions; and
   a predetermined one of a plurality of output signals producible when the third conductor connects the first conductor and the second conductor in each of the plurality of interconnecting positions.

2. The signal-producing mechanism of claim 1, wherein at least one of the plurality of interconnecting positions corresponds to one of a plurality of variable resistance configurations defined by predetermined interconnected portions of the first conductor, the second conductor and the third conductor.

3. The signal-producing mechanism of claim 1, wherein at least two of the first conductor, the second conductor and the third conductor have at least one position in a substantially different plane than the remaining one of the first conductor, the second conductor and the third conductor.

4. The signal-producing mechanism of claim 1, wherein the third conductor comprises a portion of a first conductive ring having an at least partially conical surface, wherein the portion of the first conductive ring is movable between a first plane and a second plane, and wherein the portion of the first conductive ring connects the first conductor and the second conductor in the second plane.

5. The signal-producing mechanism of claim 1, wherein at least two of the first conductor, the second conductor and the third conductor have known electric characteristics such that the predetermined one of the plurality of output signals is determinable via voltage division.

6. The signal-producing mechanism of claim 1, wherein the predetermined one of the plurality of output signals varies depending upon a time period during which the third conductor connects the first conductor and the second conductor in one of the plurality of interconnecting positions.

7. A signal-producing mechanism, comprising:
   an actuator mechanism movable in a plurality of directions;
   a first conductor;
   a second conductor having a varying, predetermined spacing from the first conductor;
   a third conductor positioned on the actuator mechanism and having a plurality of interconnecting positions between the first conductor and the second conductor, the interconnecting positions corresponding to the plurality of mobility directions of the actuator mechanism;
   a predetermined one of a plurality of output signals producible when the third conductor connects the first conductor and the second conductor in each of the plurality of interconnecting positions; and
   a signal analyzer and a controllable device, wherein the signal analyzer is operable to receive and process the predetermined output signal of the plurality of output signals and generate a predetermined control signal from a plurality of control signals to control a predetermined function associated with the controllable device.

8. The signal-producing mechanism of claim 7, wherein the controllable device comprises a wireless electrical device having a visual display with a movable graphic, and wherein the predetermined function comprises a positioning of the movable graphic on the visual display in a selected direction.

* * * * *